(12) United States Patent
Sham

(10) Patent No.: US 7,933,194 B2
(45) Date of Patent: Apr. 26, 2011

(54) READ-ONCE RECORD MEDIUM

(76) Inventor: Wellen Sham, Taipei (TW)

( * ) Notice: Subject to any disclaimer, the term of this patent is extended or adjusted under 35 U.S.C. 154(b) by 1389 days.

(21) Appl. No.: 11/344,234

(22) Filed: Feb. 1, 2006

(65) Prior Publication Data

US 2007/0177490 A1     Aug. 2, 2007

(51) Int. Cl.
*G11B 3/70*     (2006.01)
(52) U.S. Cl. ....................................... 369/284
(58) Field of Classification Search .................. None
See application file for complete search history.

(56) References Cited

U.S. PATENT DOCUMENTS

| | | | | |
|---|---|---|---|---|
| 4,937,810 | A * | 6/1990 | Drexler et al. | 369/275.1 |
| 5,709,978 | A * | 1/1998 | Hirotsune et al. | 430/270.13 |
| 6,228,440 | B1 * | 5/2001 | Dailey et al. | 428/1.1 |
| 2001/0030919 | A1 * | 10/2001 | Tsukada | 369/47.22 |

* cited by examiner

*Primary Examiner* — Joseph Haley
(74) *Attorney, Agent, or Firm* — The Weintraub Group, P.L.C.

(57) ABSTRACT

The present invention relates to a read-once record medium that comprises a data substrate, a sensitive layer; a reflective layer, an adhesive layer and a transparent substrate; thereby, the structure of the sensitive layer or the data substrate will be changed when laser beams with specific power emitted from an optical storage device pass through the data substrate and focus on the sensitive layer, and the laser beams will be reflected by the sensitive layer and can not be recognized by the optical storage device.

20 Claims, 2 Drawing Sheets

READ-ONCE RECORD MEDIUM

BACKGROUND OF THE INVENTION

1. Field of the Invention

The present invention relates to a read-once record medium, and more particularly to a record medium with a sensitive layer, thereby, the structure of the sensitive layer or the data substrate will be changed (or destroyed) when laser beams with specific power emitted from an optical storage device pass through the data substrate and focus on the sensitive layer, and the laser beams will be reflected by the sensitive layer and can not be recognized by the optical storage device.

2. Description of the Related Art

In general, audio and video files can be downloaded from a server and played in a DVD or CD player by means of a simple security check according to a prior art. However, the security check may be skipped by users, and thus DVD or CD publishers cannot request users to pay for the downloaded files and thus the unauthorized use of DVD or CD media becomes more and more.

At present, there are systems or solutions that can solve the problem of protecting DVD or CD from unauthorized copying. For example, U.S. Pat. No. 5,991,403 issued to Aucsmith, et al disclosed a method for encoding MPEG compatible video data for subsequent compression that comprises detecting a plurality of frames of video data organized as a GOP, generating an encryption key for the GOP, and encrypting the video data using GOP-synchronized substitution, transposition, and rotation transformations that are parameterized by offsets derived from the generated encryption key.

U.S. Pat. No. 5,915,018 issued to Aucsmith, et al disclosed a cryptographic system and method for secure distribution and management of cryptographic keys for use in a DVD copy protection scheme. A DVD disc having compressed, encrypted content written on a first portion of the disc, and the content encryption key, itself encrypted with a second key and written out of band on a second portion of the disc is used to provide content, key, and control information to a DVD player.

U.S. Pat. No. 5,991,403 is used for coding MPEG compatible video data for subsequent compression, and U.S. Pat. No. 5,915,018 is a cryptographic system and method for secure distribution and management of cryptographic keys for use in a DVD copy protection scheme. However, these patented technologies do not provide a system or a method for portable devices, and the portable device including but not limited to a portable medium player having an LCD display device can legally download audio files and video file in a DVD or CD and play the file from the portable device.

SUMMARY OF THE INVENTION

Therefore, it is a primary objective of the present invention to overcome the foregoing shortcomings of the prior art by providing a read-once record medium, which has a plurality of pre-record data and the pre-record data will be destroyed after being read by an optical storage device with a specific laser power.

Another objective of the present invention is to overcome the foregoing shortcomings of the prior art by providing a read-once record medium, which has a plurality of grooves for recording data and the recording data will be destroyed after being read by an optical storage device with a specific laser power.

To achieve the foregoing objectives, a read-once record medium in accordance with the present invention comprises: a data substrate, having a plurality of pre-recorded data; a sensitive layer, disposed above the data substrate; a reflective layer, disposed above the sensitive layer; an adhesive layer, disposed above the reflective layer; and a transparent substrate, disposed above the adhesive layer; thereby, the structure of the sensitive layer or the data substrate will be changed (or destroyed) when laser beams with specific power emitted from an optical storage device pass through the data substrate and focus on the sensitive layer, and the laser beams will be reflected by the sensitive layer and can not be recognized by the optical storage device.

To achieve the foregoing objectives, a read-once record medium in accordance with the present invention comprises: a data substrate, having a plurality of grooves for recording data; a sensitive layer, disposed above the data substrate; a reflective layer, disposed above the sensitive layer; an adhesive layer, disposed above the reflective layer; and a transparent substrate, disposed above the adhesive layer; thereby, the structure of the sensitive layer or the data substrate will be changed (or destroyed) when laser beams with specific power emitted from an optical storage device pass through the data substrate and focus on the sensitive layer, and the laser beams will be reflected by the sensitive layer and can not be recognized by the optical storage device.

DETAILED DESCRIPTION OF THE PREFERRED EMBODIMENTS

So-called read-once record medium means that the data therein will be destroyed after being read by an optical storage device, that is, the data of the record medium can not be illegally copied, therefore data of the record medium can be protected. The detail of the read-once record medium's structure will be described as following.

Figure 1:
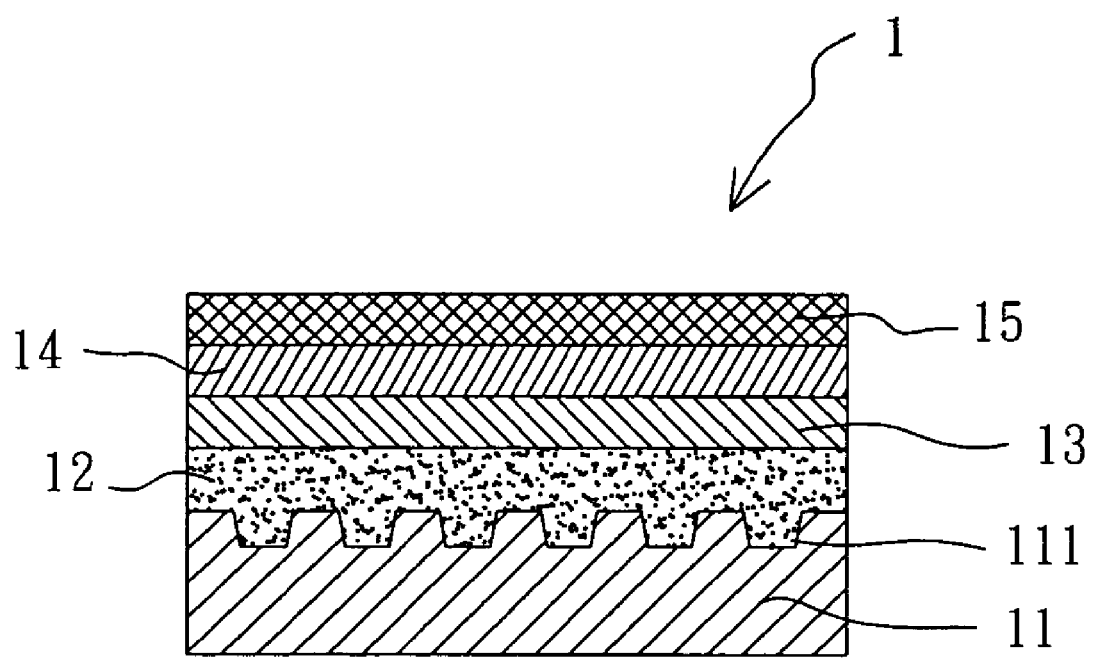
FIG. 1 is a cross-section view of a read-once record medium according to a preferred embodiment of the invention.

Referring to FIG. 1, a cross-section view of a read-once record medium according to a preferred embodiment of the invention is shown. The read-once record medium 1 of the present invention is, for example, but not limited to, a CD, DVD-ROM, HD DVD-ROM or BD-ROM, which comprises: a data substrate 11, a sensitive layer 12, a reflective layer 13, an adhesive layer 14, and a transparent substrate 15.

Wherein, the data substrate 11 is made of plastic material, for example, but not limited to a polycarbonate (PC), and the data substrate 11 has pre-record (that is pre-burned) data 111, for example but not limited to a computer software(s), image data or audio data.

The sensitive layer 12 is disposed above the data substrate 11 and is sensitive to light (e.g., a laser beam), and its structure will be changed (or destroyed) when a laser beam of a specific power is emitted from an optical storage device (not shown) and passes through the data substrate 11 and focuses on the sensitive layer 12. The sensitive layer 12 can be formed by a spin coating process with an organic dye on the data substrate 11 or by a sputtering coating process with an inorganic alloy material on the data substrate 11, wherein the inorganic alloy material is a metal alloy.

The reflective layer 13 is disposed above the sensitive layer 12. The reflective layer 13 reflects back the laser beams emitted by the optical storage device so that the reflected laser beams are recognized by a photo-detector of the optical storage device. Wherein the reflective layer 13 is, for example, but not limited to, comprised of silver or a silver alloy. Because the reflective layer 13 is of the type found according to the prior art, the description herein will not discuss the reflective layer 3 further.

The adhesive layer 14 is disposed above the reflective layer 13 for adhering the data substrate 11 and the transparent substrate 15.

The transparent substrate 15 is disposed above the adhesive layer 14 and is made of plastic material, for example, but not limited to, a polycarbonate (PC) for printing or inking picture(s) or word(s) thereon.

In use, the sensitive layer 12 is disposed above the data substrate 11 and has sensitivity to light (e.g., a laser beam), and the structure of the sensitive layer 12 or the data substrate 11 is changed (or destroyed) when a laser beam with a specific power is emitted from the optical storage device (not shown) an passes through the data substrate 11, and focuses on the sensitive layer 12. The laser beams is reflected by the sensitive layer 12 and can not be recognized by the optical storage device because the structure of the sensitive layer 12 has been destroyed. Preferably, the power of the laser beam is more than 1.0 mW. The reflectivity, or refractive index, of the sensitive layer 12 is changed when the laser beam passes through the data substrate 11 and focuses on the sensitive layer 12. Therefore, the laser beam reflected by the sensitive layer 12 can not be recognized by the optical storage device. The data substrate 11 deforms due to heat (e.g., 300°-400° C.) generated when the laser beam passes through the data substrate 11. The deformed data substrate 11 causes the reflected laser beam to not be recognized by the optical storage device. Therefore, the pre-recorded data 111 of the record medium 1 will not be readable and can not be detected by the photo detector of the optical storage device due to the structure of the sensitive layer 12 and/or the data substrate 11 having been changed after being read with a laser of specific power, such that the pre-recorded data 111 of the record medium 1 can only be read once. Therefore the contents' provider is willing to reduce the sale price of the CDs or DVDs.

Figure 2:
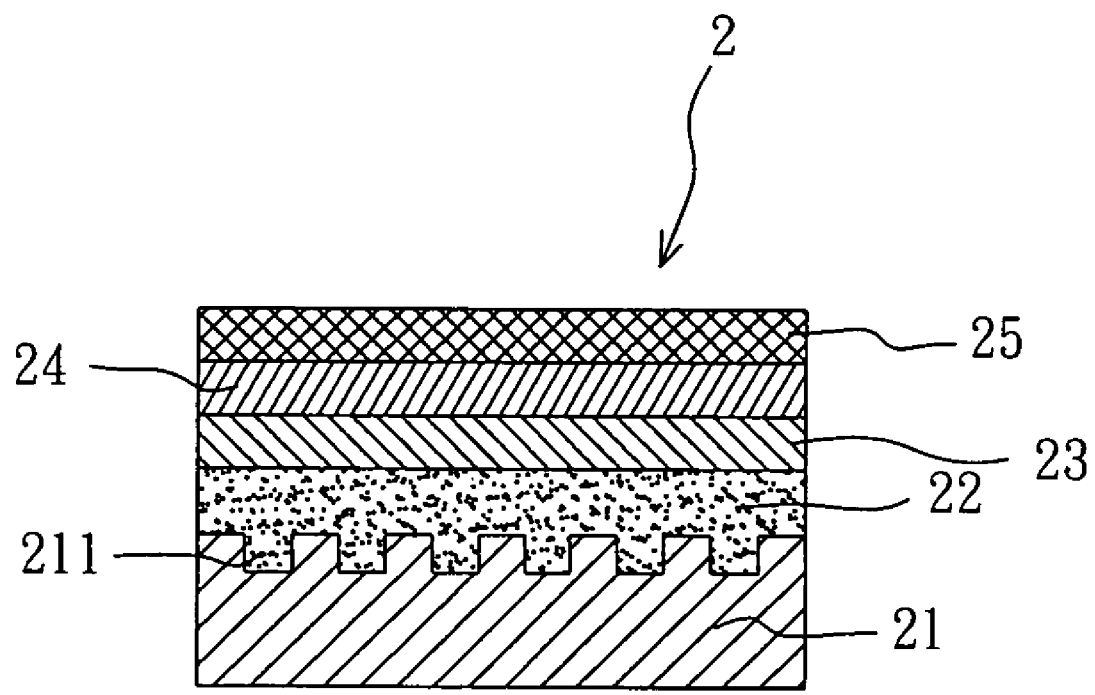
FIG. 2 is a cross-section view of a read-once record medium according to another preferred embodiment of the invention.

Referring to FIG. 2, it shows a cross-section view of a read-once record medium 2 according to another preferred embodiment of the invention. As shown in FIG. 2, the read-once record medium 2 of the present invention is, for example, but not limited to, a CD, DVD-ROM, HD DVD-ROM or BD-ROM, which comprises: a data substrate 21, a sensitive layer 22, a reflective layer 23, an adhesive layer 24, and a transparent substrate 25.

Wherein, the data substrate 21 is made of plastic material, for example, but not limited to, a polycarbonate (PC), and the data substrate 11 has a plurality of grooves 211 for recording data, for example but not limited to a computer software(s), image data or audio data.

The sensitive layer 22 is disposed above the data substrate 21 and has sensitivity to light (e.g., a laser beam), and its structure will be changed (or destroyed) when a laser beam with a specific power is emitted from an optical storage device and passes through the data substrate 21 and focuses on it. The sensitive layer 22 can be formed by a spin coating process with an organic dye on the data substrate 21 or by a sputtering coating process with an inorganic alloy material on the data substrate 21, wherein the inorganic alloy material is a metal alloy.

The reflective layer 23 is disposed above the sensitive layer 22 which reflects the laser beam emitted by the optical storage device and the reflected laser beam is recognized by the photo-detector of the optical storage device. Wherein the reflective layer 23 is made from, for example, but not limited to, silver or a silver alloy.

The adhesive layer 24 is disposed above the reflective layer 23 for adhering the data substrate 21 and the transparent substrate 25.

The transparent substrate 25 is disposed above the adhesive layer 24 and is made of plastic material, for example, but not limited to, a polycarbonate (PC) for printing or inking picture(s) or word(s) thereon.

In use, the contents' provider records the data, such as computer software(s), image data or audio data into the grooves 211. The structure of the sensitive layer 22 and/or the data substrate 21 is changed (or destroyed) when a laser beam with a specific power is emitted from the optical storage device (not shown) and passes through the data substrate 21 and focuses on the sensitive layer 22. The laser beam is reflected by the sensitive layer 22 and can not be recognized by the optical storage device because the structure of the sensitive layer 22 has been destroyed. Preferably, the power of the laser beam is more than 1.0 mW. The reflectivity, or refractive index, of the sensitive layer 22 is changed when the laser beam passes through the data substrate 21 and focuses on the sensitive layer 22. Therefore, the laser beam reflected by the sensitive layer 22 can not be recognized by the optical storage device. The structure of the data substrate 21 deforms and destroys the recorded data in the grooves 211 due to heat (e.g., 300°-400° C.) generated when the laser beam passes through the data substrate 21. The data substrate 21, causes the reflected laser beams to not be recognized by the optical storage device. Therefore, the recorded data in the grooves 211 of the record medium 2 will be destroyed and can not be detected by the photo detector of the optical storage device due to the structure of the sensitive layer 22 and/or the data substrate 21 having been changed (or destroyed) after being read once, such that the recorded data in the grooves 211 of the record medium 2 can not be copied. Therefore the contents' provider is willing to reduce the sale price of the CDs or DVDs.

With the implementation of the present invention, the record medium has a sensitive layer, and the structure of the sensitive layer or the data substrate will be changed (or destroyed) when a laser beam with specific power is emitted from an optical storage device and passes through the data substrate and focuses on the sensitive layer. The laser beam is then reflected by the sensitive layer and can not be recognized by the optical storage device. Therefore, the present invention definitely can overcome the prior art apparatus for preventing unauthorized copying.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances performance over the conventional structure and further complies with the patent application requirements and is submitted to the Patent and Trademark Office for review and granting of the commensurate patent rights.

What is claimed is:

1. A read-once record medium, comprising:
a data substrate having pre-recorded data disposed thereon;
a sensitive layer disposed above said data substrate;
a reflective layer disposed above said sensitive layer;
an adhesive layer disposed above said reflective layer; and
a transparent substrate disposed above said adhesive layer;
wherein at least one of said sensitive layer and said data substrate is deformed when a laser beam having a specific power is emitted from an optical storage device and the laser beam passes through said data substrate and focuses on said sensitive layer, and said laser beam is reflected by at least one of said deformed sensitive layer and said deformed data substrate and can not be recognized by said optical storage device.

2. The read-once record medium of claim 1, wherein said data substrate and said transparent substrate comprise a plastic material.

3. The read-once record medium of claim 2, wherein said plastic material is polycarbonate.

4. The read-once record medium of claim 1, wherein said sensitive layer comprises a spin coated layer having an organic dye on said data substrate.

5. The read-once record medium of claim 1, wherein said sensitive layer comprises a sputtering coated layer having an inorganic alloy material on said data substrate.

6. The read-once record medium of claim 5, wherein said inorganic alloy material is a metal alloy.

7. The read-once record medium of claim 1, wherein said power of said laser beam 1.0 mW or greater.

8. The read-once record medium of claim 1, wherein said record medium is selected from the group consisting of a CD, DVD-ROM, HD DVD-ROM or BD-ROM.

9. The read-once record medium of claim 1, wherein said sensitive layer has a reflectivity index, and wherein the reflectivity index is changed when said laser beam passes through said data substrate and focuses on said sensitive layer.

10. The read-once record medium of claim 1, wherein said data substrate is deformed due to heat generated when said laser beam passes through said data substrate.

11. A read-once record medium, comprising:
a data substrate having a plurality of grooves for recording data;
a sensitive layer disposed above said data substrate;
a reflective layer disposed above said sensitive layer;
an adhesive layer disposed above said reflective layer; and
a transparent substrate disposed above said adhesive layer;
wherein at least one of said sensitive layer and said data substrate is deformed when a laser beam having a specific power is emitted from an optical storage device, and the laser beam passes through said data substrate and focuses on said sensitive layer, and said laser beam is reflected by at least one of said deformed sensitive layer and said deformed data substrate and can not be recognized by said optical storage device.

12. The read-once record medium of claim 11, wherein said data substrate and said transparent substrate comprise a plastic material.

13. The read-once record medium of claim 12, wherein said plastic material is polycarbonate.

14. The read-once record medium of claim 11, wherein said sensitive layer comprises a spin coated layer having an organic dye on said data substrate.

15. The read-once record medium of claim 11, wherein said sensitive layer comprises a sputtering coated layer having an inorganic alloy material on said data substrate.

16. The read-once record medium of claim 15, wherein said inorganic alloy material is a metal alloy.

17. The read-once record medium of claim 11, wherein said power of said laser beam 1.0 mW or greater.

18. The read-once record medium of claim 11, wherein said record medium is selected from the group consisting of a CD, DVD-ROM, HD DVD-ROM or BD-ROM.

19. The read-once record medium of claim 11, wherein said sensitive layer has a reflectivity index, wherein the reflectivity index is changed when said laser beam passes through said data substrate and focuses on said sensitive layer.

20. The read-once record medium of claim 11, wherein said data substrate is deformed due to heat generated when said laser beam passes through said data substrate.

* * * * *